(12) United States Patent
Johnson et al.

(10) Patent No.: US 10,650,831 B1
(45) Date of Patent: *May 12, 2020

(54) SYSTEMS AND METHODS FOR AUTHENTICATION PROGRAM ENROLLMENT

(71) Applicant: United Services Automobile Association (USAA), San Antonio, TX (US)

(72) Inventors: Zakery Layne Johnson, Santa Clara, UT (US); Maland Keith Mortensen, San Antonio, TX (US); Gabriel Carlos Fernandez, San Antonio, TX (US); Debra Randall Casillas, Helotes, TX (US); Sudarshan Rangarajan, San Antonio, TX (US); Thomas Bret Buckingham, Fair Oaks, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/993,501

(22) Filed: May 30, 2018

Related U.S. Application Data

(63) Continuation of application No. 15/404,468, filed on Jan. 12, 2017, now Pat. No. 10,013,984, which is a
(Continued)

(51) Int. Cl.
*G10L 17/22* (2013.01)
*G10L 17/06* (2013.01)
(Continued)

(52) U.S. Cl.
CPC ............ *G10L 17/22* (2013.01); *G10L 15/22* (2013.01); *G10L 15/265* (2013.01); *G10L 17/02* (2013.01);
(Continued)

(58) Field of Classification Search
CPC ...................................................... G10L 17/22
(Continued)

(56) References Cited

U.S. PATENT DOCUMENTS

| 5,229,764 A | 7/1993 | Matchett |
| 7,590,538 B2 | 9/2009 | St. John et al. |

(Continued)

OTHER PUBLICATIONS

U.S. Appl. No. 15/993,933, filed May 31, 2018, Selective Passive Voice Authentication.
(Continued)

*Primary Examiner* — Susan I McFadden
(74) *Attorney, Agent, or Firm* — Perkins Coie LLP

(57) ABSTRACT

Various embodiments of the technology described herein alleviate the need to specifically request enrollment information from a user to enroll the user in a voice biometric authentication program. For example, the system can receive a voice interaction from a user where the voice interaction includes a request or a command having one or more portions. After the user is authenticated using non-voice biometric authentication information, the system enrolls the user into a voice biometric authentication program for at least one portion of the request or the command. The system also enrolls the user into the voice biometric authentication program for other requests or commands that include one of the at least one portion of the request or the command and portions of one or more second requests or commands for which the user has been enrolled into the voice biometric authentication program.

20 Claims, 8 Drawing Sheets

Related U.S. Application Data continuation of application No. 14/491,740, filed on Sep. 19, 2014, now Pat. No. 9,548,979.

(51) Int. Cl.
| | | |
|---|---|---|
| *G10L 17/02* | (2013.01) | |
| *H04L 29/06* | (2006.01) | |
| *G10L 15/22* | (2006.01) | |
| *G10L 17/04* | (2013.01) | |
| *G10L 15/26* | (2006.01) | |

(52) U.S. Cl.
CPC .............. *G10L 17/04* (2013.01); *G10L 17/06* (2013.01); *H04L 63/0861* (2013.01); *G10L 2015/223* (2013.01)

(58) Field of Classification Search
USPC .......................................................... 704/235
See application file for complete search history.

(56) References Cited

U.S. PATENT DOCUMENTS

| | | | |
|---|---|---|---|
| 8,401,539 | B2 | 3/2013 | Beenau et al. |
| 8,965,770 | B2 | 2/2015 | Petrushin |
| 9,007,473 | B1 | 4/2015 | Worley, III |
| 9,082,055 | B2 | 7/2015 | Breuer |
| 9,225,701 | B2 | 12/2015 | Gongaware et al. |
| 9,247,037 | B2 | 1/2016 | Clark et al. |
| 9,262,612 | B2 | 2/2016 | Cheyer et al. |
| 9,538,005 | B1 | 1/2017 | Nguyen et al. |
| 9,548,979 | B1 * | 1/2017 | Johnson .............. H04L 63/0861 |
| 9,639,682 | B2 | 5/2017 | North |
| 9,697,836 | B1 | 7/2017 | Lousky |
| 9,710,983 | B2 | 7/2017 | Asmar |
| 9,928,834 | B2 | 3/2018 | Liu et al. |
| 10,013,983 | B1 | 7/2018 | Johnson |
| 10,013,984 | B1 * | 7/2018 | Johnson .............. H04L 63/0861 |
| 2015/0095028 | A1 | 4/2015 | Karpey |
| 2016/0021117 | A1 | 1/2016 | Harmon |

OTHER PUBLICATIONS

U.S. Appl. No. 15/404,468, filed Jan. 12, 2017, Systems and Methods for Authentication Program Enrollment.

U.S. Appl. No. 15/226,375, filed Aug. 2, 2016, Selective Passive Voice Authentication.

U.S. Appl. No. 14/491,740, filed Sep. 19, 2014, Systems and Methods for Authentication Program Enrollment.

* cited by examiner

SYSTEMS AND METHODS FOR AUTHENTICATION PROGRAM ENROLLMENT

CROSS-REFERENCE TO RELATED APPLICATIONS

This application is a continuation of U.S. patent application Ser. No. 15/404,468 entitled "SYSTEMS AND METHODS FOR AUTHENTICATION PROGRAM ENROLLMENT," filed on Jan. 12, 2017, now allowed, which is a continuation of U.S. patent application Ser. No. 14/491,740 entitled "SYSTEMS AND METHODS FOR AUTHENTICATION PROGRAM ENROLLMENT," filed on Sep. 19, 2014, issued as U.S. Pat. No. 9,548,979 on Jan. 17, 2017, each of which are hereby incorporated by reference in their entireties for all purposes. This application is related to U.S. Ser. No. 15/226,375, entitled "SELECTIVE PASSIVE VOICE AUTHENTICATION."

TECHNICAL FIELD

Various embodiments of the present disclosure generally relate to authentication. More specifically, various embodiments of the present disclosure relate to systems and methods for authentication program enrollment.

BACKGROUND

The protection and security of customer information is critical from an organization's perspective, not only to comply with applicable laws, but to earn and foster customers' trust. Enhanced security often comes at the cost of convenience for the user. For example, customers may be required to provide additional information simply to be enrolled in an authentication program (e.g., select and answer security questions). Additionally, the authentication process may become more of an inconvenience as the user is asked to provide additional information to verify his or her identity.

BRIEF DESCRIPTION OF THE DRAWINGS

Embodiments of the present disclosure will be described and explained through the use of the accompanying drawings in which.

Figure 1:
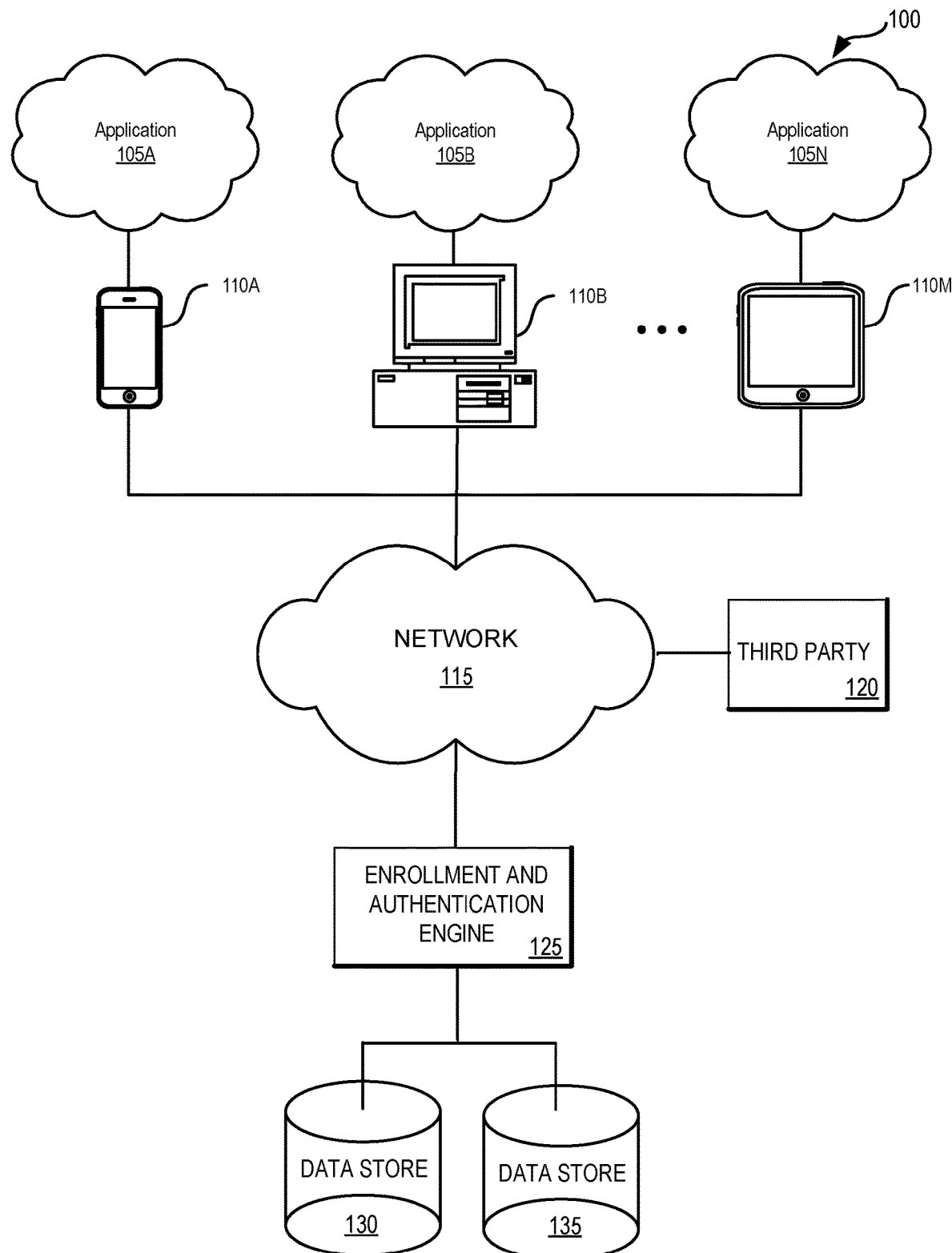
FIG. 1 illustrates an example of a network-based operating environment in accordance with various embodiments of the disclosure.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while embodiments of the present disclosure are amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure.

DETAILED DESCRIPTION

Various embodiments of the present disclosure generally relate to authentication. More specifically, various embodiments of the present disclosure relate to systems and methods for authentication program enrollment.

Traditional methods of authentication on a voiceline (e.g., telecommunications network, internet connection, etc.) may identify and verify the user based on knowledge factors. For example, the user may call and provide a name to identify the user and an address to verify the user's identity. More sophisticated methods of authentication may identify the user using an ownership factor such as a device or token associated with the device of the user. Thereafter, the user's identity may be verified with a knowledge factor such as additional personal information. For example, the user may be asked to provide a PIN, birthdate, address, phone number, account number, and/or other information. The constant repeating and revealing of personal information may be cumbersome and less secure for the user.

In some embodiments of the present disclosure, an inherence factor (i.e., biometric information) may be used to identify the user and/or to verify the user's identity. For example, the user may be identified by collecting information from the device being used to call the organization (e.g., via a device fingerprint, token, phone number, etc.). This information may be used to create a biometric profile containing characteristics that may be used to verify future biometric samples. Once the biometric profile is created, the user's identity may be verified by comparing the caller's biometrics (e.g., voice biometrics) with previously generated or collected biometrics associated with the user. For example, if the voice biometrics match to a certain threshold, then the user may be authenticated. Thus, in some systems, a user may simply speak a command and be authenticated without actively providing additional information.

To enroll a user in an authentication system or program that allows authentication based on voice biometrics, samples of the user's voice must be collected and analyzed. If the user is passively enrolled in the authentication program, the user is enrolled without actively responding to a request for information (e.g., device information or voice biometrics are gathered in the background without requiring the user to actively provide any information). In contrast, if the user is actively enrolled in the authentication program, the user actively responds to requests for information (e.g., setting up a username/password, providing personal information such as a date of birth, provide biometric samples, etc.).

Once the samples are obtained, the samples may be analyzed to derive characteristics of the user's voice and speech. In some embodiments, a voice profile and/or voice print (i.e., a stored template used to identify a person via their voice) may be created. The characteristics, voice profile, and/or voice print may be associated with the user. During authentication, the caller's voice and speech may be analyzed and compared with previously collected and analyzed samples of the user's voice to ensure the caller is in fact the user.

When voice biometrics are used to authenticate a user, two types of authenticating voice biometrics may be used: text-dependent authentication and text-independent authentication. In text-dependent authentication, the user has previously stated a specific phrase or portions of a specific phrase in an enrollment process. The previously-captured spoken phrase is then used to authenticate the person by comparing the voice biometrics of the previously spoken phrase to the voice biometrics of the current phrase. Text-independent authentication does not require that the user has previously spoken a particular phrase but does require previous voice interaction with the user to be captured and used to create a voice print.

Text-dependent authentication currently results in a lower false positive identification rate. Additionally, text-dependent authentication requires less spoken text for successful identification. However, a challenge with using text-dependent authentication is that the user is required to have previously spoken the phrase to the authenticating entity.

Current systems and methods of obtaining the voice biometric samples to be used for authentication or verification may be onerous for the user and yield less accurate voice profiles than the systems and methods proposed herein. For example, current methods of obtaining voice biometric information may require the user to speak the same phrase repeatedly in the same session, particularly for text-dependent authentication. Repeating the same phrase may not be a desired use of time and energy for the user. Additionally, the continuous repetition of the user word or phrase may distort the accuracy of the user's voice biometrics by not providing a realistic sampling of the user's voice. For example, the user's voice may sound different during different times of the day, in different states of health, in different environments, etc., all of which cannot be captured during an enrollment process in which the user repeats the same phrase during the same session Thus, receiving samples of the user's voice during different times of the day and during different circumstances may result in a more accurate voice profile or voice print.

Various embodiments of the systems and methods described herein alleviate the need to request enrollment information to enroll a user a voice biometric authentication program by using voice samples provided by the user for uses and purposes other than enrollment. More specifically, a user's spoken request may be used as enrollment information for the particular spoken request or for all spoken requests. For example, when the user calls and states a request, the request is primarily used to determine the information or activity the user is calling in regard to. But, the request may secondarily be used as a voice sample for enrollment in a voice biometric authentication program.

For example, in some embodiments, when the user calls to collect information by speaking a word or phrase (e.g., "Check account balance"), the spoken words or phrases may be analyzed to derive characteristics such as intonation, attenuation, volume, accent, speed, cadence, and pitch of the user's voice. The spoken request may be used to create or enhance an existing voice print or voice profile of the user's voice. The user may be automatically enrolled or registered in the voice biometric authentication program after a certain number and quality of samples are collected and used to generate the characteristics, voice profile, and/or voice print. In some embodiments the number and quality of samples must meet or exceed an enrollment threshold. In some embodiments, the user may be notified of the opportunity to be enrolled in the voice biometric authentication program and asked if the user chooses to be enrolled. In some embodiments, enrollment occurs on a per-command or per-request basis. In other embodiments, the user is enrolled for all commands or requests.

After enrollment, derived characteristics, voice print, or voice profile of future requests or commands may be compared to characteristics, voice prints, or voice profiles derived or created from previously collected samples of the user's voice. If the characteristics of the user's voice match the characteristics from the previously collected samples of the user's voice to a certain threshold, then the user may be authenticated or admitted to the mobile application, website, electronic safe, room, or other medium. In some embodiments, the user's voice cannot be matched to the degree necessary for authentication. In those cases, the person may be asked to provide (e.g., by speaking or keying in) additional authenticating information such as a PIN, member number, a video stream, etc. In some embodiments, the user may simply be asked to re-state the command or request. In yet other embodiments, the user may be asked to share GPS, video, take a photo, etc.

Thus, various embodiments describe systems and methods in which the user speaks a command or phrase which is used not only to request information or take an action, but also as a potential biometric that can enroll or lead to enrollment into a voice biometric authentication system. The enrollment process is not onerous or time consuming for the user because the user is simply performing the actions the user typically takes (i.e., verbally making a request on a call).

In some embodiments, a user speaks a series of morphemes, words, phrases, clauses, sentences, numbers, etc. (e.g., check account balance, one, seven, transfer funds, etc.) that can be combined numerous ways such that the user can be authenticated using those words without having to state the same morphemes, words, phrases, clauses, sentences, numbers, etc. over and over to be authenticated. In an example, the user can state commands such as "account balance, pay my credit card bill, speak with a representative" or other commands or requests several times to the authenticating entity during different calls to the authenticating entity. These commands or requests may be combined and used to develop a voice profile of how the user typically speaks the words.

The combination of words may be of a fixed length, a variable length, may span the entire word space, and/or only be a subset thereof. The previously provided samples of the person saying these words may be used to create a voice profile that can be used to generate an authentication decision. For example, the previously captured or recorded samples (or characteristics thereof) may be directly compared with the current version of the person stating the words. If the previously recorded samples match the current version to a certain level, the person may be authenticated or the approved match may be used as a factor to authenticate the person. As another example, the recorded samples may be indirectly used by creating a voice profile. As a result, even words, phrases, or numbers not previously recorded but that are currently spoken can be evaluated to determine if the person can be successfully authenticated.

Device identification is specifically discussed in many examples in the description as part of two-factor authentication and for identification purposes, but these examples are not meant to be limiting. Rather, multi-factor authentication and other types of authenticating and identifying information may be used to authenticate the user in connection with the biometric authentication. For example, in addition to recording the user's voice, the system may record a video of the user speaking. Then, in addition to voice biometrics, facial recognition can be used as part of a multi-factor authentication.

Additionally, the disclosure specifically discusses voice biometric authentication. However, the disclosure is not limited to voice biometric authentication. Rather, other types of biometric authentication are contemplated. For example, behavioral biometrics (e.g., how quickly the user types, the pressure in which the user presses the keyboard, etc.) may be used to create a behavioral biometric profile. The user may be passively enrolled in a behavioral biometrics authentication program. Similarly, touch screen-based navigation systems may collect fingerprints which can be used as part of the biometric authentication process. As another example, a camera near or in a computing device may be used to collect retinal images as part of an eye-tracking navigational system. In some embodiments, multiple biometrics may be collected and/or used during the authentication process. In the following description, for the purposes of explanation, numerous specific details are set forth in order to provide a thorough understanding of embodiments of the present disclosure. It will be apparent upon reading the disclosure, however, to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device, a mobile phone, a tablet computer, a mobile media device, a mobile gaming device, a vehicle-based computer, a dedicated terminal, a public terminal, desktop, or laptop computer, a kiosk, etc.). In some embodiments, applications 105A-105N may be stored on the computing device or may be stored remotely. These computing devices can include mechanisms for receiving and sending traffic by connecting through network 115 to enrollment and authentication engine 125, third party 120, and data stores 130 and 135

Computing devices 110A-110M may be configured to communicate via the network 115 with enrollment and authentication engine 125 and third party 120. In some embodiments, computing devices 110A-110M can retrieve or submit information to enrollment and authentication engine 125 and run one or more applications with customized content retrieved by enrollment and authentication engine 125, third party 120, and data stores 130 and 135. For example, computing devices 110A-110M can execute a browser application or a customized client to enable interaction between the computing devices 110A-110M and enrollment and authentication engine 125, third party 120, and data stores 130 and 135.

Network 115 can include any combination of local area and/or wide area networks, using both wired and wireless communication systems. In one embodiment, network 115 uses standard communications technologies and/or protocols. Thus, network 115 may include links using technologies such as Ethernet, 802.11, worldwide interoperability for microwave access (WiMAX), 3G, 4G, CDMA, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (Ipsec).

Enrollment and authentication engine 125 can be running on one or more servers and can be used to enroll or register users into a biometric authentication program. Enrollment and authentication engine 125 may use one voice interaction or a series of voice interactions to enroll the user into the biometric authentication program by deriving characteristics of the user's voice and speech from the user's spoken commands or requests. The enrollment may apply only to certain requests or commands, or the enrollment may apply to all requests or commands spoken by the user. Enrollment may include associating the voice profile, voice print, or characteristics of the voice or specific commands or requests with the user. Once the user is enrolled, the user's identity may be verified simply by speaking the command or request.

Enrollment and authentication engine 125 can be used to authenticate users to a mobile application, website, to perform a specific activity, or for other activities. Enrollment and authentication engine 125 may be communicably coupled with third party 120, data stores 130 and 135, and computing devices 110A-110M and may communicate, access or receive data (e.g., tokens, verification information, voice authentication services, etc.) from computing devices 110A-110M, third party 120, and data stores 130 and 135. Enrollment and authentication engine 125 may be associated with a membership organization, and the users may be members or potential members of the membership organization. The organization may be a financial institution and/or an insurance company.

Authentication may be based on information received through various user interfaces running on computing devices 110A-110M, third party 120, or other interactions, communications, and/or other inputs (e.g., e-mails, tokens, and/or communications via other channels). Enrollment and authentication engine 125 can be calibrated/configured by individual companies or service providers based on risk tolerance and/or other business objectives to authenticate users.

In some cases, authentication to the application, process, website, or activity may be based on different criteria. For example, in addition to rendering an authentication decision, enrollment and authentication engine 125 may be configured to compute a risk profile or score. The risk profile or score may be used by itself to make a decision, or it may be used in conjunction with other profiles, scores, and/or business practices. Enrollment and authentication engine 125 may also be configured to recommend an access level the user should be granted. In some embodiments, enrollment and authentication engine 125 includes various data processing and analytic tools that allow for implementation, creation, and evaluation of users and user information retrieved from data stores 130 and 135.

Third party 120 may be a language processing company, voice verification analyzer, or other entity that may analyze, process, or provide information for authenticating users. Third party 120 may communicate with computing devices 110A-110M and enrollment and authentication engine 125 to provide information that helps to determine whether the user should be authenticated. For example, third party 120 may provide a speech to text services to enrollment and authentication engine 125 to assist with authentication of the user.

The data stores 130 and 135 can be used to manage storage and access to user data such as registered user devices, user identifications, voice profiles, voice prints, characteristics of user voices, token IDs, financial information, authentication history, user preferences, member identification numbers, device fingerprints, personal identification numbers, and other information. Data stores 130 and 135 may be a data repository of a set of integrated objects that are modeled using classes defined in database schemas. Data stores 130 and 135 may further include flat files that can store data. Enrollment and authentication engine 125 and/or other servers may collect and/or access data from the data stores 130 and 135.

Figure 2:
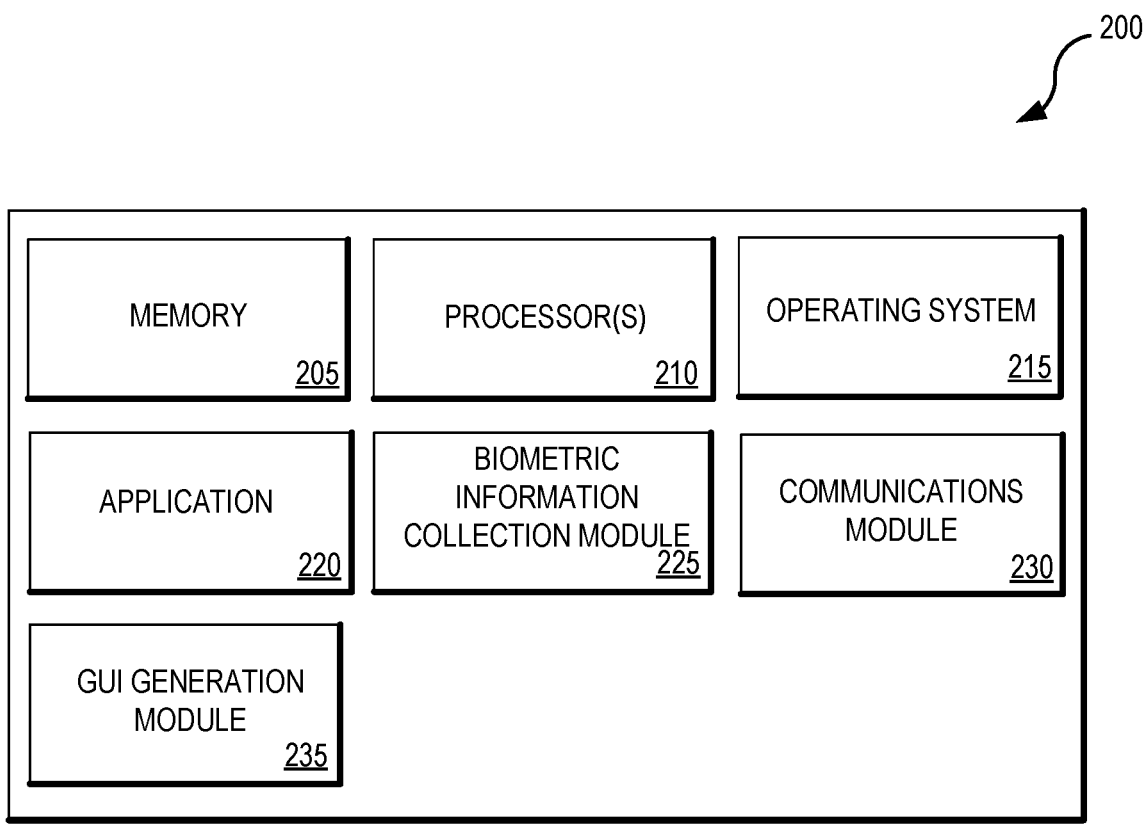
FIG. 2 illustrates various components of a computing device that may be used in accordance with one or more embodiments of the disclosure.

FIG. 2 illustrates a set of components 200 within computing device 110 according to one or more embodiments of the present disclosure. According to the embodiments shown in FIG. 2, computing device 110 can include memory 205, one or more processors 210, operating system 215, application 220, biometric information collection module 225, communications module 230, and graphical user interface (GUI) generation module 235. Other embodiments of the present disclosure may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, application 220 and biometric information collection module 225 can be combined into a single component.

Memory 205 can be any device, mechanism, or populated data structure used for storing information. In accordance with some embodiments of the present disclosure, memory 205 can encompass any type of, but is not limited to, volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of operating system 215, application 220, biometric information collection module 225, communications module 230, and GUI generation module 235.

Operating system 215 can provide a software package that is capable of managing the hardware resources of computing device 110. Operating system 215 can also provide common services for software applications running on processor(s) 210. In accordance with various embodiments, operating system 215 can coordinate resources for multiple applications 220 that allow a user to access and interact with enrollment and authentication engine 125. For example, application 220 can include a banking application, a money transfer application, a social networking application, a gaming application, and the like.

Application 220 can access a server associated with an organization (e.g., enrollment and authentication engine 125) to retrieve account details or perform other activities. However, before allowing access, a user of application 220 generally must be authenticated. Traditionally, the authentication process has been cumbersome, requiring a username and password and/or PIN be entered by the user. In contrast, various embodiments provide for a PIN-less and password-less authentication scheme or process that uses a native (or default) application running on the computing device to authenticate the user.

Biometric information collection module 225 may collect biometric information from a user. The biometric information may be collected by receiving a spoken command, phrase, request, or other utterance. Biometric information collection module 225 may send the spoken request or command, an enrollment request, and/or an authentication request to enrollment and authentication engine 125 and/or third party 120 based on the request or command received. In some embodiments, the request or command is streamed in real-time to the authorizing entity. In some embodiments, the enrollment process may include operations such as the operations illustrated in FIG. 5 and described below.

In some embodiments, the spoken command or request may be processed or partially processed by biometric information collection module 225 (e.g., biometric information collection module 225 may derive the characteristics from the biometric sample). Other types of biometric information may be collected by biometric information collection module 225 such as eye movement, fingerprints, behavioral biometrics (e.g., keystrokes), etc.

Communications module 230 can send and receive requests, approvals, and other information (e.g., process biometric information from biometric information collection module 225) to enrollment and authentication engine 125 and third party 120. For example, communications module 230 may receive a communication that the user's credentials are verified and the user is authenticated. Alternatively, application 220 may receive a communication that the user's credentials are not verified and a request for the user to provide additional credentials such as a PIN, password, picture, video, another voice sample, or other authenticating information. The requested information may include a token, token ID, device fingerprint, biometric sample, username/password, PINs, and/or other information. In some embodiments, communications module 230 can communicate an identifier of the device (e.g., phone number, embedded code, or a device fingerprint based on characteristics of the hardware and or software etc.) to the enrollment and authentication engine 125.

GUI generation module 235 can generate one or more GUI screens that allow for interaction with a user. In at least one embodiment, GUI generation module 235 generates a graphical user interface receiving and/or conveying information to the user. For example, the GUI generation module 235 may display information in response to a request of the user after the authentication process.

Figure 3:
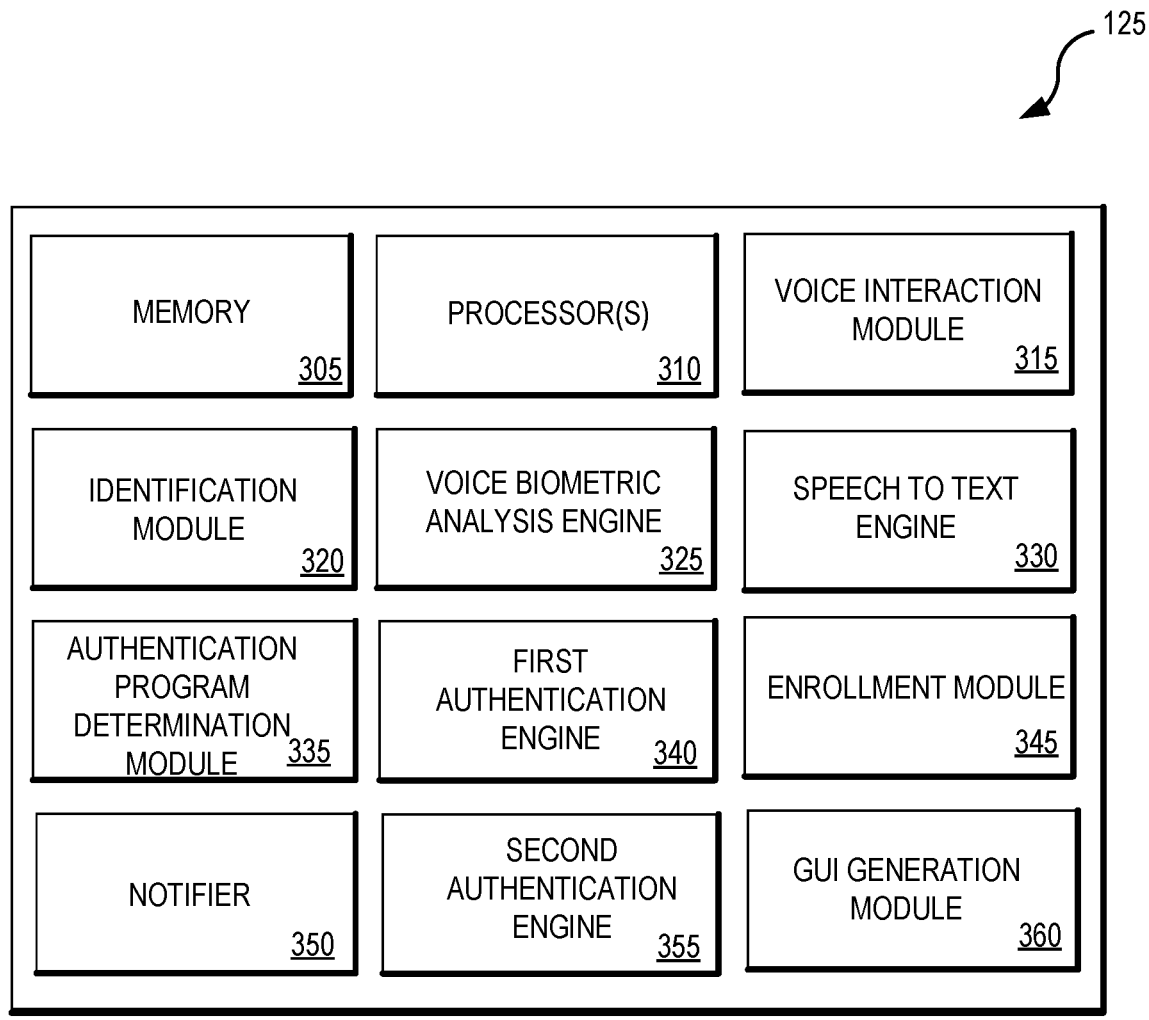
FIG. 3 illustrates various components of an enrollment and authentication engine that may be used in accordance with various embodiments of the present disclosure.

FIG. 3 illustrates a set of components within enrollment and authentication engine 125 according to one or more embodiments of the present disclosure. According to the embodiments shown in FIG. 3, enrollment and authentication engine 125 can include memory 305, one or more processors 310, voice interaction module 315, identification module 320, voice biometric analysis engine 325, speech to text engine 330, authentication program determination module 335, first authentication engine 340, enrollment module 345, notifier 350, second authentication engine 355, and GUI generation module 360.

Other embodiments of the present invention may include some, all, or none of these modules and components along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information as described above for memory 205. Memory 305 may be used to store instructions for running one or more applications or modules on processor(s) 310. For example, memory 305 could be used in one or more embodiments to house all or some of the instructions needed to execute the functionality of voice interaction module 315, identification module 320, voice biometric analysis engine 325, speech to text engine 330, authentication program determination module 335, first authentication engine 340, enrollment module 345, notifier 350, second authentication engine 355, and GUI generation module 360.

Voice interaction module 315 may receive any spoken communication such as a spoken request or command. The communication may be received from biometric information collection module 225. The voice interactions may be made over a phone line when the user calls to speak a representative or while the user is speaking to an interactive voice response system. Voice interaction module 315 may send the spoken request or command to the voice biometric analysis engine 325 and/or the speech to text engine 330.

In some embodiments, voice interaction module 315 receives the spoken communication via other electronic communication mediums (i.e., channels). For example, the electronic communication containing the token can be sent via text message, e-mail, internet relay chat (IRC), file transfer protocol (FTP), hypertext transfer protocol (http), hypertext transfer protocol secure (https), or transmission control protocol/internet protocol (TCP/IP), among others. Voice interaction module 315 may also fulfill requests or commands for the user once the user has been authenticated by first authentication engine 340 or second authentication engine 355.

Identification module 320 identifies the user. In some embodiments, the user is identified by the device that the voice interaction is communicating with. The device may be identified via a phone number, device fingerprint, embedded code, a token generated on or associated with the device, etc. In some embodiments, the user may be identified in alternative ways such as by providing a name or providing biometric data (e.g., voice). In some embodiments, the device identification may be used as a factor in authentication to identify the caller.

Voice biometric analysis engine 325 may receive the spoken request or command from biometric information collection module 225 and analyze the user's voice. Voice biometric analysis engine 325 may use the spoken request or command to derive characteristics of the user's voice such as pitch, cadence, volume, intonation, etc. In some embodiments, voice biometric analysis engine 325 may use previously recorded or analyzed portions of commands or requests to piece together how the currently spoken request or command should sound if the caller is indeed the user.

In some embodiments, a model of the user's voice or the user's voice speaking the particular command or request may be created from numerous samples. The sample size may be based on the quality of the samples, the types of requests or commands being made (e.g., the higher risk of the request, the more accurate the sample needs to be). After enough samples are collected, the command or request is automatically enrolled in the second authentication program without asking the user to provide additional voice samples. When enrolled in the second authentication program, the user need not provide additional information for verification after stating a command or request. The user may simply launch an application or call the organization from a registered device and state the request or command. If the user's voice biometrics match the voice biometrics previously determined for the user, the user is authenticated without providing further information. In some embodiments, the enrollment is on a per-command/request basis. In other embodiments, all voice interactions, including all commands/requests are enrolled in the second authentication program.

Voice biometric analysis engine 325 may also receive text of the voice interaction from speech to text engine 330. The text may determine the specific command or request being made. In some embodiments, separate profiles are created for separate commands. The derived characteristics may be specifically tailored to the particular request or command. For example, the user may call in regularly and state "Check Account Balance" to check her account balance. Each time the user states "balance," the user may have a unique deflection in the user's voice. The text-dependent, command-based approach to voice authentication provides the authenticating organization with numerous samples to create a profile of how the user states a particular command. In other embodiments, text-independent authorization is used such that the characteristics or profile are not specific to the request or command but are generalized to the user. A text-independent approach may require the authenticating entity to take more samples to generate a profile prior to enrolling the user.

Speech to text engine 330 may convert the voice interaction into text. The text may be used to verify the user in connection with the voice biometrics, particularly when text-dependent authentication is being used. Speech to text engine 330 may further determine the intent of the speech. For example, if the user states that that the user is calling about a roofing claim, speech to text engine 330 may determine that the user is calling to discuss a homeowner's insurance claim. Speech to text engine 330 may communicate the text and/or the intent of the voice interaction to voice biometric analysis engine 325 to be included in the analysis of the user's voice and speech. Speech to text engine 330 may further communicate the text and/or the intent of the voice interaction to the authentication program determination module 330 to determine whether the voice interaction should be directed to the first authentication engine 340 (traditional authentication) or to the second authentication engine 355 (biometric authentication).

Authentication program determination module 335 can determine whether the user and/or the specific voice interaction (e.g., command or request) is enrolled in the biometric authentication program. The biometric authentication program can authenticate the user using voice biometrics and the second authentication engine 355 would be used for authentication. If the user is not enrolled in the biometric authentication program, the user can be authenticated by the first authentication engine 340.

The determination of whether the user and/or the specific voice interaction is enrolled in the biometric authentication program may be based on the particular request or command received from the user or it may be based simply on the identification of the user. For example, in some embodiments, once the user is identified, authentication program determination module 335 may determine that the user can be authenticated using voice biometrics for all requests. In other embodiments, the user may be authenticated using voice biometrics for certain requests or commands (e.g., requests or commands in which the organization has collected adequate samples to create the voice print of the user stating the particular request or command).

In some embodiments, authentication program determination module 335 may receive information from voice biometric analysis engine 325 indicating that the voice interaction is unsatisfactory for biometric authentication. For example, if the user did not speak the request clearly or loudly enough, biometric authentication using the second authentication engine 355 may not be possible and the request may be routed to first authentication engine 340. Thus, authentication program determination module 335 may send the voice interaction to the first authentication engine 340 when the user or voice interaction is not enrolled in the second authentication program and/or if the voice interaction is not suitable for a voice biometric analysis. Authentication program determination module 335 may send the voice interaction to the second authentication engine 355 when the user or voice interaction is enrolled in the biometric authentication program and/or if the voice interaction is suitable for a voice biometric analysis.

First authentication engine 340 can authenticate the user or the request/command by requesting additional data from the user. Authentication with the first authentication engine 340 may include asking the user for a credential such as a PIN, a passcode, a barcode, a retina scan, a fingerprint, an answer to a security question, a token, a spoken word or phrase, or other information. The user may be required to provide authentication information that meets or exceeds an authentication threshold or level to provide an assurance of the user's identity.

The authentication threshold or level may be determined by the request or command. If the user provides the information but is not authenticated, the user may be given an opportunity to provide additional evidence or the user may be denied access. When the user has been authenticated, first authentication engine 340 may communicate the authentication status of the user to voice interaction module 315 for fulfillment of the user's request or command.

After the user is authenticated by first authentication engine 340, the user's voice from the request or command may be analyzed by voice biometric analysis engine 325. In some embodiments, the authentication level for the request or command is higher than the authentication level needed to use the user's voice in enrollment (i.e., even if the user is precluded from taking part in the activity because the authentication level is too low, the user's voice sample could be used for enrollment purposes). The results may be used to derive characteristics, create a voice profile, and/or voice print of the user's voice for the specific command or request. Enrollment module 345 may determine whether the user or the command or request is eligible for enrollment in a biometric authentication program or if the user has previously opted out. In some embodiments, when the user is eligible for enrollment of all or one request or command, enrollment module 345 may notify notifier 350 of the user's eligibility and wait for a response from the user prior to enrolling the user in the voice biometric authentication program.

The enrollment decision may be based on a number and quality of previous times the user has stated the particular request or command. For example, if a voice print has been created from three separate interactions of the user speaking the words "Check account balance," enrollment module 345 may determine that the user should be enrolled in the voice biometric authentication program for the command "Check account balance." In some embodiments, the enrollment decision may be based on a total number of samples collected.

The user may be enrolled passively, meaning that the user was not required to provide any additional enrollment information. In some embodiments, simply speaking a request or command a certain number of times in the natural course of a user/service provider relationship may result in enrollment. In other embodiments, the user may be enrolled after the user has actively responded to enrollment requests (e.g., setting up a username/password, providing answers to security questions, etc.). Enrollment module 345 may enroll the user or command/request in the voice biometric authentication program by flagging in a user profile that a satisfactory voice profile has been created for all or specific requests/commands, allowing the user to be authenticated using biometric authentication.

After enrollment in the voice biometric authentication program, when the user calls, the user may be authenticated by second authentication engine 355. From the user's perspective, when the user calls in after enrollment, the user may be authenticated passively (i.e., by speaking the command or request without actively providing any additional information).

Notifier 350 may notify the user that the user is eligible for enrollment in the voice biometric authentication program after receiving enrollment eligibility information from enrollment module 345. The user may be given the option to opt out or accept the enrollment offer. In some embodiments, the user may be automatically enrolled but provided an informational notification so that the user is aware of the program and does not mistakenly believe that security has been compromised or security standards have been lowered.

Second authentication engine 355 can authenticate the user using voice biometrics when the user has been enrolled in the voice biometric authentication program for at least one request or command. After a request to authenticate the user to a mobile application, a website, and/or to perform an activity within a mobile application or website is received and the user has been identified, second authentication engine 355 verifies the user using biometric evaluation on the spoken request or command. The verification may be done by comparing characteristics of spoken command or request received by voice interaction module 315 and analyzed by voice biometric analysis engine 325 with characteristics of previously collected voice biometric samples.

When the characteristics of the request or command match characteristics of biometric samples collected previously by enrollment and authentication engine 125 at or above a certain threshold, the user may be verified. For example, if characteristics of the user's spoken request such as pitch, intonation, speed, attenuation, accent, cadence, and volume match the characteristics of the previously recorded samples of the same or similar command or request then the user may be verified. The threshold may depend on the user, the activity the user is requesting (e.g., riskier activities may require a better match), recent account activity, historical behavior of the user, etc. For example, the match threshold may be 90% when the user is requesting a wire transfer whereas the match threshold may only be 50% when a user is requesting an account balance. In some embodiments, the same threshold applies to all users.

Second authentication engine 355 can use the information from identification module 320 and the biometric comparison along with other information in making an authentication decision. The decision generated by second authentication engine 355 is used in granting or denying access to an application or website. In some embodiments, the decision generated by second authentication engine 355 is used in granting or denying access to a restricted command. Examples of restricted commands include a command to log a person in to an account, a command to cause a transfer of funds from one account to another account, and a command accessing restricted data, among others.

Second authentication engine 355 can authenticate the user, deny the request for authentication, or request additional credentials based on the results of the biometric comparison and/or type of activity being requested. For example, second authentication engine 355 may authenticate the user if the user is identified (e.g., via a device identification) and the user's identity is verified using voice biometrics to a certain threshold. Second authentication engine 355 may deny the request, for example, if the biometric samples do not match to at least a certain level, if fraud has been reported on the user's account, or if the user cannot provide additional authentication information when requested.

When second authentication engine 355 determines that additional credentials are needed (e.g., the biometric match was close to meeting the level for authentication, the biometric sample was distorted, the service provider is having an outage, etc.), additional credentials may be requested. The additional credentials can be additional or repeated biometric samples (e.g., the user repeats the command), a PIN, answering a security question, calling a member service representative, among others. In some embodiments, if biometric authentication fails, second authentication engine 355 may attempt to authenticate the user passively using other methods. For example, second authentication engine 355 may attempt to geolocate the user using cell phone triangulate or other methods. If the user is in an expected location, the user may be authenticated even if the biometric authentication was unsuccessful. If the user is authenticated, second authentication engine 355 communicates the results of the voice biometric comparison to voice interaction module 315 for fulfillment of the user's request or command.

GUI generation module 360 is similar to GUI generation module 235. GUI generation module 360 can generate one or more GUI screens that allow for interaction with a user of the enrollment and authentication engine 125. In at least one embodiment, GUI generation module 360 generates a graphical user interface allowing a user of the mobile device to set preferences, authentication standards, rules, constraints, customize messages, and/or otherwise receive or convey information to the user.

Figure 4:
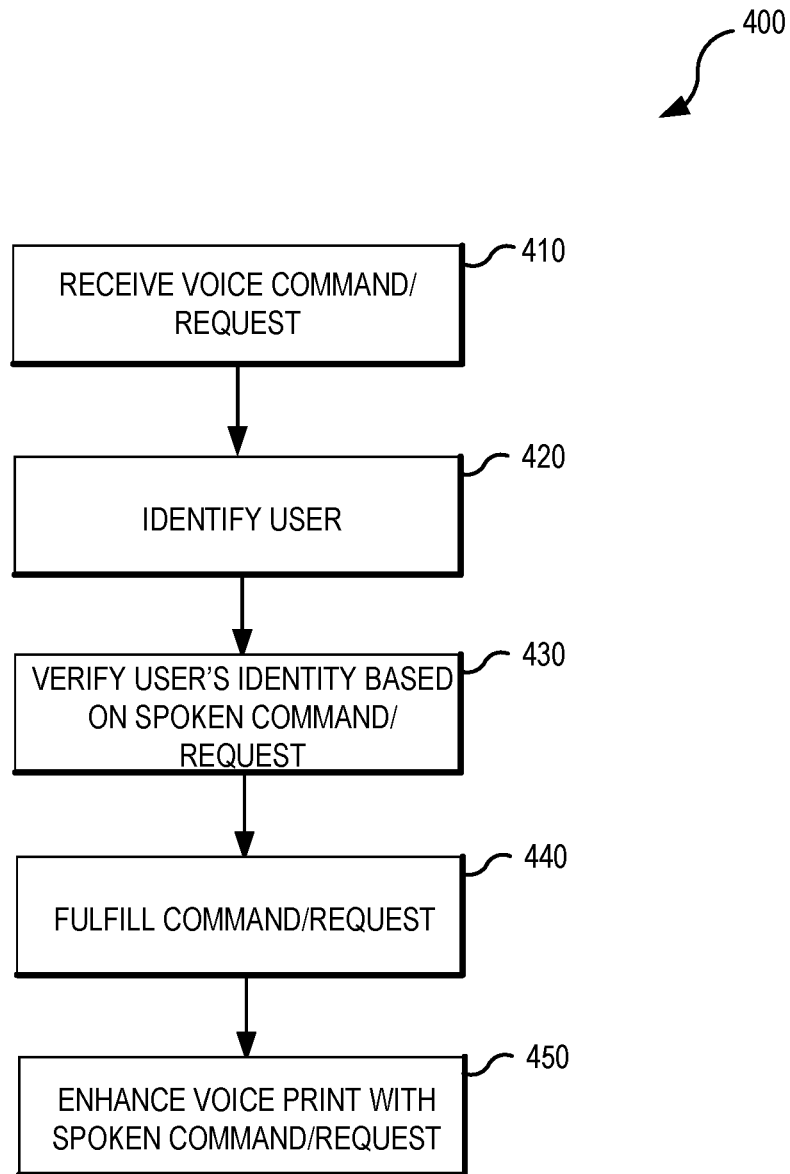
FIG. 4 is a flowchart illustrating a process flow for authentication after enrollment in a voiceline authentication program in accordance with some embodiments of the present disclosure.

FIG. 4 is a flowchart illustrating a process flow 400 for authentication after a user is enrolled in the voice biometric authentication program in accordance with some embodiments of the present disclosure. Other authentication process flows are contemplated. The operations illustrated in FIG. 4 may be performed by one or more components, devices, or modules such as, but not limited to, computing devices 110A-110M, enrollment and authentication engine 125, processor 210, voice interaction module 315, identification module 320, voice biometric analysis engine 325, speech to text engine 330, authentication program determination module 335, first authentication engine 340, enrollment module 345, notifier 350, second authentication engine 355, and GUI generation module 360, or other components or device. In some embodiments, fewer than all of the steps are performed, whereas in other embodiments additional operations are performed. Moreover, in some embodiments, the operations may be performed in different orders.

A command or request to access information or perform an activity is received via a voiceline in receiving operation 410. For example, a user could call using VoIP to request to view a homeowner's insurance claim. Identifying operation 420 identifies the user. The user may be identified based on the device or communication channel in which the user is calling from (e.g., IP address, phone number, etc.) or based on information provided by the user (e.g., user states name or member number). Once the user is identified, the user's identity may be verified based on a biometric analysis of the user's spoken request or command in verifying operation 430. The biometric analysis may include deriving characteristics of the user's voice from the request or command and comparing those characteristics with characteristics of the user previously speaking the same command or request.

Fulfilling operation 440 fulfills the request or command when the biometric analysis verifies the user's identity. In some embodiments, a threshold must be met for verification. The biometric analysis may be used to enhance the biometric model, voice print, or voice profile of the user's voice. Enhancing operation 450 enhances the user's voice print with the addition of the request or command, using the request or command as another sample to generate a more accurate voice print for the user.

Figure 5:
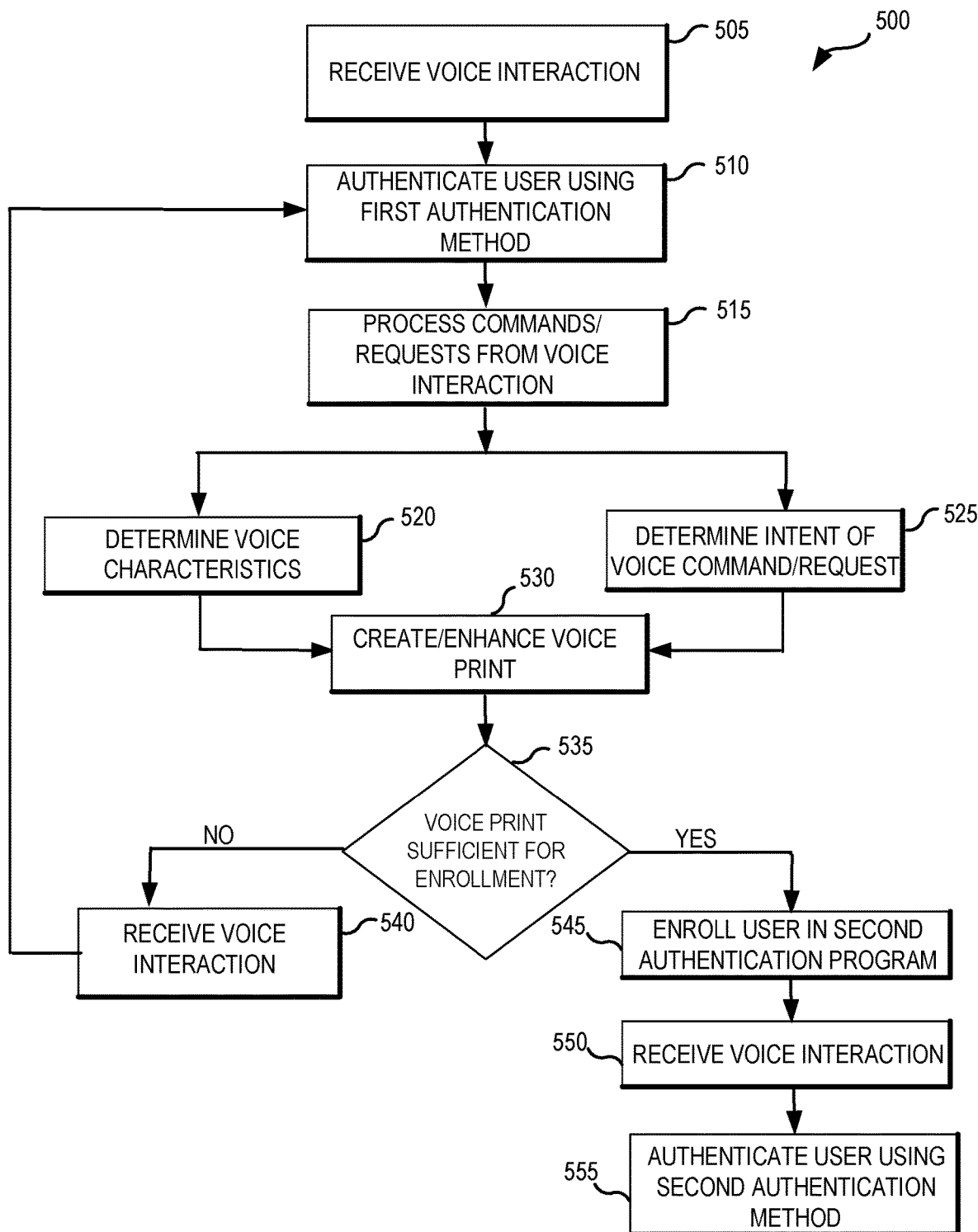
FIG. 5 is a flowchart illustrating an authentication process flow that may be used to enroll a user in an authentication program in accordance with various embodiments of the disclosure.

FIG. 5 is a flowchart illustrating an authentication process flow 500 that may be used to enroll a user in a biometric authentication program in accordance with various embodiments of the disclosure. In FIG. 5, the user has not yet been registered for voice biometric authentication.

The operations illustrated in FIG. 5 may be performed by one or more components, devices, or modules such as, but not limited to, computing devices 110A-110M, enrollment and authentication engine 125, processor 310, voice interaction module 315, identification module 320, voice biometric analysis engine 325, speech to text engine 330, authentication program determination module 335, first authentication engine 340, enrollment module 345, notifier 350, second authentication engine 355, and GUI generation module 360, or other components or devices. In some embodiments, fewer than all of the steps are performed, whereas in other embodiments additional operations are performed. Moreover, in some embodiments, the operations may be performed in different orders.

Receiving operation 505 receives a voice interaction (e.g., request, command, or other voice communication). The voice interaction can be received by an authorizing entity such as a financial institution or other service provider. Authenticating operation 510 authenticates the user using a first authentication method. The first authentication method may require the user to submit a password, username, PIN, verify information, or otherwise actively provide information to the authorizing entity. Processing operation 515 processes the command or request from the voice interaction by fulfilling the operation. For example, if the user requested an account balance of the account, the user would be provided the account balance of the account.

In voice characteristics operation 520, the voice characteristics of the user are determined. Characteristics may include pitch, cadence, intonation, speed and attenuation, among others. The voice characteristics may be particular to the command or request. Intent operation 525 determines the intent of the command or request. To determine the intent, the spoken command or request may be translated into text. For example, if the user states "roofing claim," the intent of the command may be to display or state the current status of the roofing claim.

Voice print operation 530 uses the voice characteristics and the intent of the command or request to create or enhance a voice print of the user. In some embodiments, a general voice print is created for the user's voice. In other embodiments, a voice print is created for each different command or request. Decision operation 535 determines whether the voice print is sufficient for enrollment into a second authentication program that authenticates at least in part using biometric information. The determination may be based on a number and quality of previously analyzed commands or requests that are the same as the command or request currently being made in the voice interaction.

If the voice print is insufficient for enrollment into the second authentication program, when the user engages in another voice interaction requiring authentication in receiving operation 540, the authentication process would begin at authenticating operation 510.

If the voice print is sufficient for enrollment into the second authentication program, the user is enrolled in the second authentication program in enrolling operation 545. Enrolling may include designating, in a user profile, a particular command or request as adequate for biometric authentication. In some embodiments, the user is enrolled in the second authentication program for all commands or requests. When a subsequent voice interaction is received in receiving operation 550, the user is authenticated using the second authentication method in authenticating operation 555. Authenticating the user using the second authentication method may include comparing voice biometrics of the user's spoken request or command with previously generated characteristics of the user's voice. In some embodiments, voice biometrics of the user's spoken request or command are compared with previously generated characteristics of the user speaking the particular request or command. If the comparison meets a threshold, the user may be authenticated without requiring the user to actively provide additional authentication information.

Figure 6:
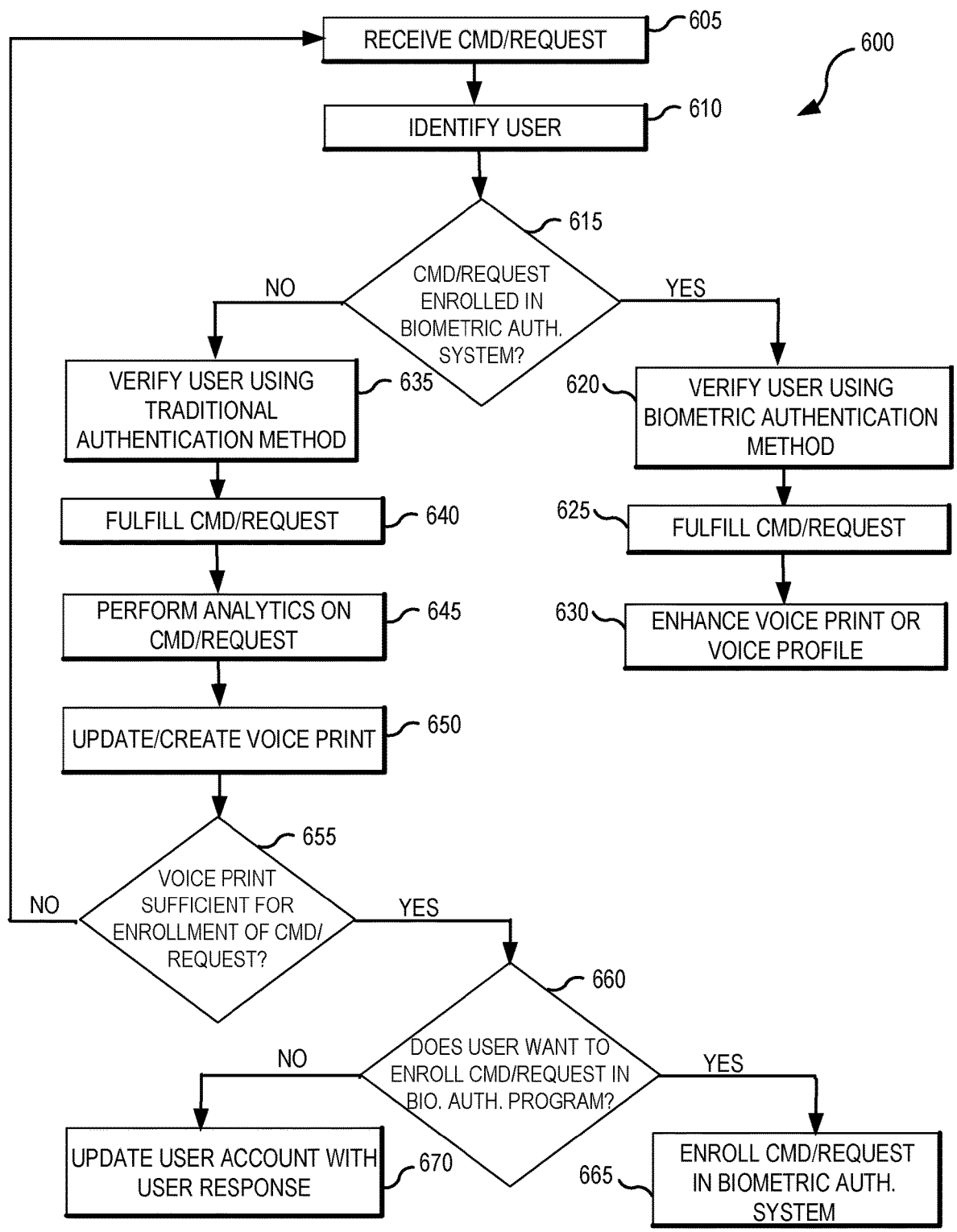
FIG. 6 is a flowchart illustrating a set of operations for authenticating a user in accordance with some embodiments of the present disclosure.

FIG. 6 is a flow chart illustrating a set of operations 600 for authenticating a user in accordance with some embodiments of the present disclosure. The operations illustrated in FIG. 6 may be performed by one or more components, devices, or modules such as, but not limited to, computing devices 110A-110M, operating system 215, application 220, voice interaction module 315, identification module 320, voice biometric analysis engine 325, speech to text engine 330, authentication program determination module 335, first authentication engine 340, enrollment module 345, notifier 350, second authentication engine 355, and GUI generation module 360, or other components or devices. In some embodiments, fewer than all of the steps are performed, whereas in other embodiments additional operations are performed. Moreover, in some embodiments, the operations may be performed in different orders, or by other components or devices. In some embodiments, fewer than all of the steps are performed, whereas in other embodiments additional operations are performed. Moreover, in some embodiments, the operations may be performed in different orders.

Receiving operation 605 receives a command or request from a user over a voiceline. A user may be identified in identifying operation 610. Decision operation 615 may determine whether the user is enrolled in a biometric authentication program for that particular command or request.

If the user is determined to be enrolled in the program for that particular request or command, verifying operation 620 verifies the user using the biometric authentication method. Verifying the user using a biometric authentication method may include extracting characteristics of the user's voice or creating a voice profile of the user speaking the request or command and comparing the sample with previously analyzed samples of the user speaking the same or similar command or request. In fulfilling operation 625 the user's command or request is fulfilled when the user is verified. If the user is not verified using the voice biometric authentication method, the user may be verified by providing additional information such as a social security number. In some embodiments the user's command or request may be denied. Enhancing operation 630 enhances the user's voice profile or voice print by incorporating the characteristics of the user speaking the command or request.

If the command or request is not enrolled in a biometric authentication system, verifying operation 635 verifies the user using a traditional authentication method. For example, the user may be asked to provide a PIN or other code. Fulfilling operation 640 fulfills the command or request when the user provides the correct information. Analyzing operation 645 performs analytics on a recording of the user speaking the command or request. The analytics may include generating characteristics of the voice or speech or creating a voice profile of the user speaking the command or request. Updating operation 650 updates or creates a voice print of the user.

Decision operation 655 determines whether the updated or created voice print is sufficient for enrollment of the command or request. If so, decision operation 655 branches to decision operation 660 which determines whether the user wants to enroll the command or request in the biometric authentication program. If the user responds that the user wants the command or request to be enrolled in the biometric authentication program, the command or request is enrolled in the biometric authentication program in enrolling operation 665. Enrolling the command or request may include updating a user profile with information about which method should be used to authenticate the user when the user makes a particular command or request.

If the user responds that the user does not want the command or request to be enrolled in the biometric authentication program, the user account or profile may be updated with this information in updating operation 670. If the updated or created voice print was insufficient for enrollment of the command or request in the biometric authentication program, a subsequently received command or request may be processed similarly beginning with receiving operation 605 until the command or request is eligible for enrollment in the biometric authentication program.

Embodiments of the present disclosure may be used to continuously authenticate a user throughout a session with an organization. The user may be authenticated to various activities performed within the session. In some embodiments, voice biometric authentication may be used as one authentication or risk factor among other authentication or risk factors. As described in commonly-assigned, U.S. application Ser. No. 13/425,227, entitled "Dynamic Risk Engine," which is herein incorporated by reference in its entirety for all purposes, in some examples, the factors may be monitored and the authentication level may change as information is gathered and analyzed during a session.

In various embodiments of the disclosure, spoken commands may be used to authenticate the user. For example, when a user is speaking with a representative or an interactive voice response system, the user's voice characteristics of a certain command may be analyzed and compared to the voice characteristics of previously analyzed and recorded samples of the user speaking the command to authenticate the user. Various commands, such as "Transfer funds" may be spoken repeatedly by the user over many phone calls such that over time, the organization will be capable of generating an accurate model of the particular way in which the user speaks the command. These spoken commands may be used to authenticate the user. Various thresholds on matches may depend on the user's historical behavior with that type of activity (e.g., does the user typically state this command) and on the riskiness of the activity, as well as other factors.

Figure 7:
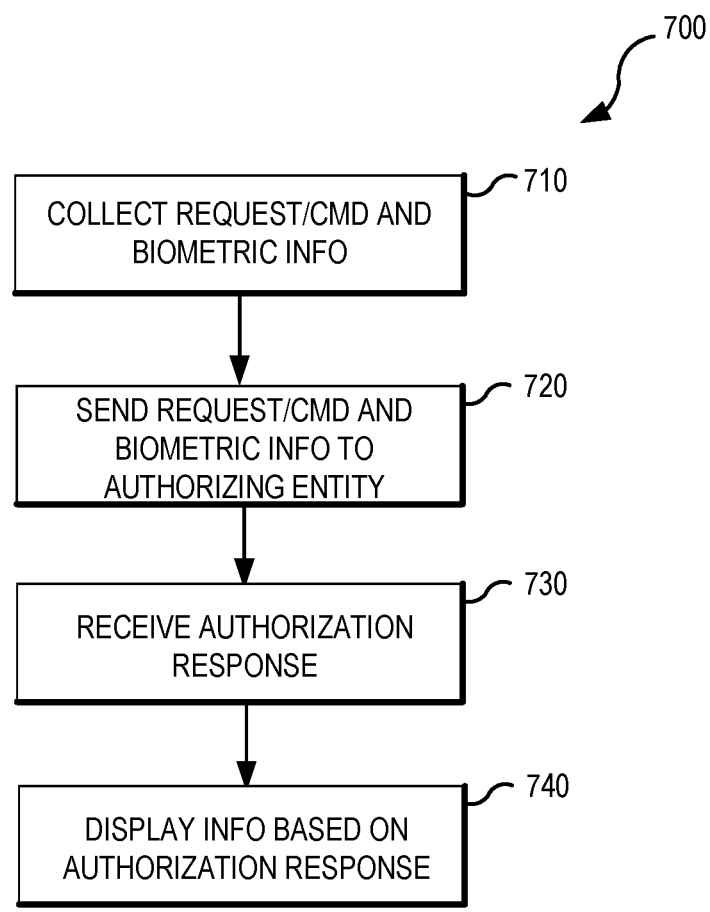
FIG. 7 is a flowchart illustrating a set of operations for authenticating a user in accordance with some embodiments of the present disclosure.

FIG. 7 is a flow chart illustrating a set of operations 700 for authenticating a user in accordance with some embodiments of the present disclosure. Collecting operation 710 collects a request or command and biometric information from a user. Sending operation 720 sends the request or command and biometric information to an authorizing entity. Receiving operation 730 receives an authorization response from the authorizing entity. Displaying operation 740 displays information based on the authorization response. For example, if the user receives authorization, then the information requested may be displayed. If the user was denied authorization, a screen notifying the user of the denial may be displayed. In some cases, the display may provide alternative methods for the user to be authenticated.

Computer System Overview

Figure 8:
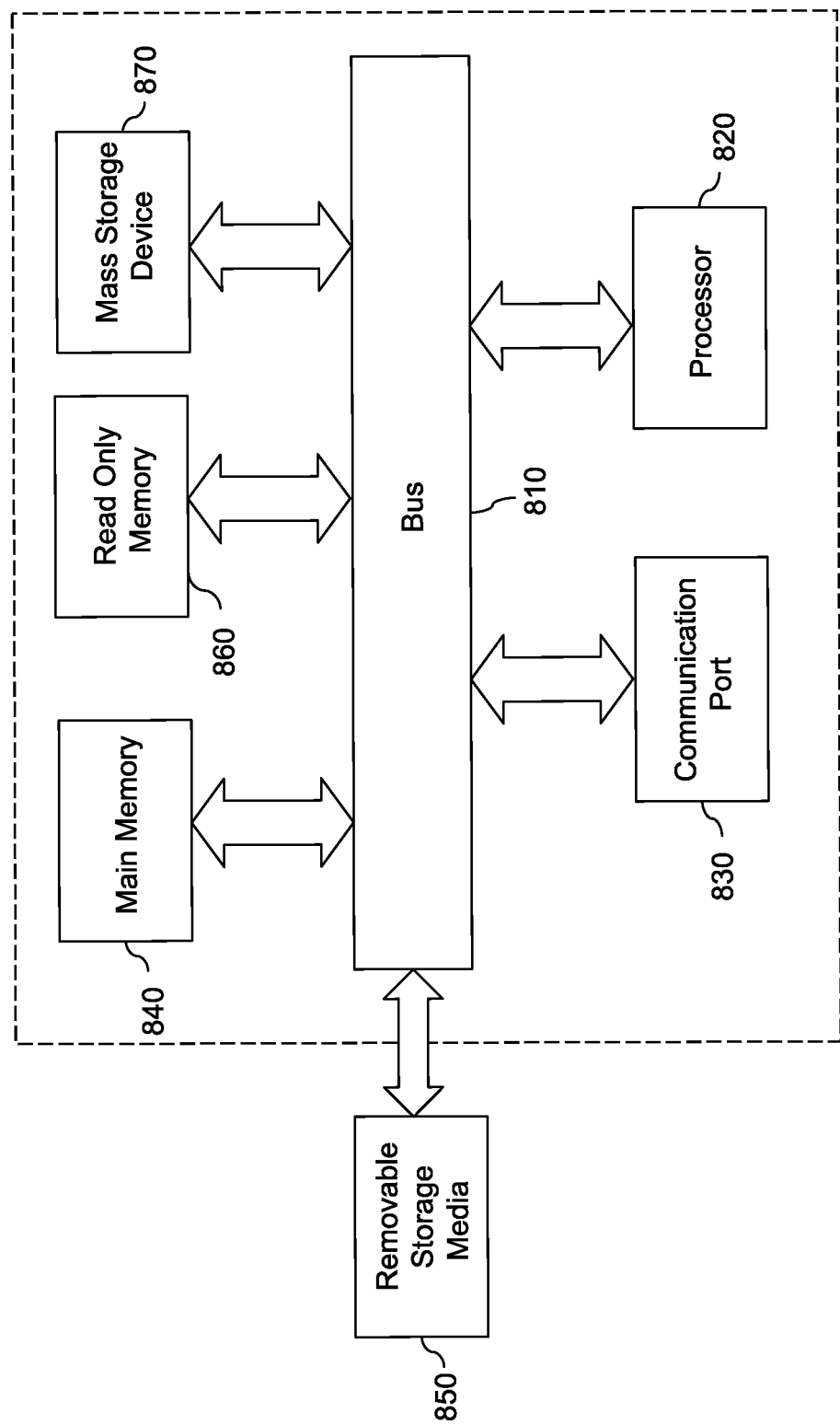
FIG. 8 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 8 is an example of a computer system 800 with which embodiments of the present disclosure may be utilized. According to the present example, the computer system 800 includes a bus 810, at least one processor 820, at least one communication port 830, a main memory 840, a removable storage media 850, a read only memory 860, and a mass storage device 870.

Processor(s) 820 can be any known processor, such as, but not limited to, an Intel® Itanium® or Itanium 2® processor(s), or AMD® Opteron® or Athlon MP® processor(s), or Motorola® lines of processors. Communication port(s) 830 can be any of an RS-232 port for use with a modem-based dialup connection, a 10/100 Ethernet port, or a Gigabit port using copper or fiber. Communication port(s) 830 may be chosen depending on a network such a Local Area Network (LAN), Wide Area Network (WAN), or any network to which the computer system 800 connects.

Main memory 840 can be Random Access Memory (RAM), or any other dynamic storage device(s) commonly known in the art. Read only memory 860 can be any static storage device(s) such as Programmable Read Only Memory (PROM) chips for storing static information such as instructions for processor 820.

Mass storage device 870 can be used to store information and instructions. For example, hard disks such as the Adaptec® family of SCSI drives, an optical disc, an array of disks such as RAID, such as the Adaptec family of RAID drives, or any other mass storage devices may be used.

Bus 810 communicatively couples processor(s) 820 with the other memory, storage, and communication blocks. Bus 810 can be a PCI/PCI-X or SCSI based system bus depending on the storage devices used.

Removable storage media 850 can be any kind of external hard-drives, floppy drives, (OMEGA® Zip Drives, Compact Disc-Read Only Memory (CD-ROM), Compact Disc-Re-Writable (CD-RW), Digital Video Disc-Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for enrolling a user in an authentication program. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A computer-implemented method comprising:
   receiving, via a network, a voice interaction from a user, wherein the voice interaction includes a request or a command identifiable from a voice of the user, wherein the request or the command includes one or more portions;
   in response to receiving non-voice biometric authentication information, authenticating the user to fulfill the request or the command made during the voice interaction;
   after the user is authenticated to or above an authentication threshold, enrolling the user into a voice biometric authentication program for at least one portion of the request or the command; and
   enrolling the user into the voice biometric authentication program for other requests or commands that include the at least one portion of the request or the command and at least one portion of a second request or command for which the user has been enrolled into the voice biometric authentication program.

2. The computer-implemented method of claim 1, further comprising:
   after enrollment into the voice biometric authentication program for the other requests or commands, authenticating the user via the voice biometric authentication program prior to fulfilling the other requests or commands made subsequently.

3. The computer-implemented method of claim 1, wherein the voice biometric authentication program authenticates the user via a voice biometric authentication method, wherein the voice biometric authentication method includes:
   receiving a subsequent voice interaction;
   deriving characteristics of a voice from the subsequent voice interaction;
   comparing the characteristics of the voice in the subsequent voice interaction with characteristics previously derived from one or more previously received voice interactions from the user; and
   authenticating the user when a match of the characteristics of the voice in the subsequent voice interaction and the characteristics previously derived from the one or more previously received voice interactions meet or exceed a threshold.

4. The computer-implemented method of claim 1, the method further comprising converting speech from the voice interaction into text, and wherein the voice biometric authentication program uses text-dependent speech recognition to authenticate the user.

5. The computer-implemented method of claim 1, the method further comprising:
   receiving a series of voice interactions; and
   creating a voice profile by analyzing the series of the voice interactions, wherein the voice interactions include at least two similar requests or commands.

6. The computer-implemented method of claim 1, wherein the user is enrolled when the user speaks the command or the request during at least two different voice navigations, wherein the method further comprises combining voice profiles of the at least one portion of the request or the command and the at least one portion of the second request or command to create a voice profile of the other request or command.

7. The computer-implemented method of claim 1, the method further comprising:
receiving, via the network, a subsequent request or command identifiable from the voice of the user;
determining an activity authentication level to fulfill the subsequent request or command;
analyzing characteristics of the subsequent request or command, the characteristics including at least one of: pitch, intonation, speed, attenuation, accent, cadence, and volume;
authenticating the user via the voice biometric authentication program to an authentication level based on the characteristics of the voice speaking the subsequent request or command; and
fulfilling the subsequent request or command when the authentication level meets or exceeds the activity authentication level.

8. A non-transitory, computer-readable medium containing instructions that, when executed by one or more processors, cause a machine to:
receive a voice interaction from a user, wherein the voice interaction includes a request or a command identifiable from a voice of the user, wherein the request or the command includes one or more portions;
in response to receiving non-voice biometric authentication information, authenticate the user to fulfill the request or the command made during the voice interaction;
after the user is authenticated to or above an authentication threshold, enroll the user into a voice biometric authentication program for at least one portion of the request or the command; and
enroll the user into the voice biometric authentication program for other requests or commands that include the at least one portion of the request or the command and at least one portion of a second request or command for which the user has been enrolled into the voice biometric authentication program.

9. The non-transitory, computer-readable medium of claim 8, wherein the instructions, when executed by the one or more processors, further cause the machine to:
after enrollment into the voice biometric authentication program for the other requests or commands, authenticate the user via the voice biometric authentication program prior to fulfilling the other requests or commands made subsequently.

10. The non-transitory, computer-readable medium of claim 8, wherein the voice biometric authentication program authenticates the user via a voice biometric authentication method, and wherein the instructions that, when executed by the one or more processors, cause the machine to authenticate the user via the voice biometric authentication method cause the machine to:
receive a subsequent voice interaction;
derive characteristics of a voice from the subsequent voice interaction;
compare the characteristics of the voice in the subsequent voice interaction with characteristics previously derived from one or more previously received voice interactions from the user; and
authenticate the user when a match of the characteristics of the voice in the subsequent voice interaction and the characteristics previously derived from the one or more previously received voice interactions meet or exceed a threshold.

11. The non-transitory, computer-readable medium of claim 8, wherein the instructions, when executed by the one or more processors, further cause the machine to:
convert speech from the voice interaction into text, and wherein the voice biometric authentication program uses text-dependent speech recognition to authenticate the user.

12. The non-transitory, computer-readable medium of claim 8, wherein the instructions, when executed by the one or more processors, further cause the machine to:
receive a series of voice interactions; and
create a voice profile by analyzing the series of the voice interactions, wherein the voice interactions include at least two similar requests or commands.

13. The non-transitory, computer-readable medium of claim 8, wherein the user is enrolled when the user speaks a spoken command or request during at least two different voice navigations.

14. The non-transitory, computer-readable medium of claim 8, wherein the instructions, when executed by the one or more processors, further cause the machine to:
receive a subsequent request or command identifiable from the voice of the user;
determine an activity authentication level to fulfill the subsequent request or command;
analyze characteristics of the subsequent request or command, the characteristics including at least one of: pitch, intonation, speed, attenuation, accent, cadence, and volume;
authenticate the user via the voice biometric authentication program to an authentication level based on the characteristics of the voice speaking the subsequent request or command; and
fulfill the subsequent request or command when the authentication level meets or exceeds the activity authentication level.

15. An enrollment and authentication system comprising:
one or more processors; and
a computer readable storage medium having instructions stored thereon, which when executed by the one or more processors, cause the enrollment and authentication system to:
receive a voice interaction from a user, wherein the voice interaction includes a request or a command identifiable from a voice of the user, wherein the request or the command includes one or more portions;
in response to receiving non-voice biometric authentication information, authenticate the user to fulfill the request or the command made during the voice interaction;
after the user is authenticated to or above an authentication threshold, enroll the user into a voice biometric authentication program for at least one portion of the request or the command; and
enroll the user into the voice biometric authentication program for other requests or commands that include the at least one portion of the request or the command and at least one portion of one or more second requests or commands for which the user has been enrolled into the voice biometric authentication program.

16. The system of claim 15, wherein the instructions, when executed by the one or more processors, further cause the enrollment and authentication system to:
after enrollment into the voice biometric authentication program for the other requests or commands, authenticate the user via the voice biometric authentication program prior to fulfilling the other requests or commands made subsequently.

17. The system of claim 15, wherein the voice biometric authentication program authenticates the user via a voice biometric authentication method, and wherein the instructions that, when executed by the one or more processors, cause the enrollment and authentication system to authenticate the user via the voice biometric authentication method further cause the enrollment and authentication system to:
   receive a subsequent voice interaction;
   derive characteristics of a voice from the subsequent voice interaction;
   compare the characteristics of the voice in the subsequent voice interaction with characteristics previously derived from one or more previously received voice interactions from the user; and
   authenticate the user when a match of the characteristics of the voice in the subsequent voice interaction and the characteristics previously derived from the one or more previously received voice interactions meet or exceed a threshold.

18. The system of claim 15, wherein the instructions, when executed by the one or more processors, further cause the enrollment and authentication system to:
   convert speech from the voice interaction into text, and wherein the voice biometric authentication program uses text-dependent speech recognition to authenticate the user.

19. The system of claim 15, wherein the instructions, when executed by the one or more processors, further cause the enrollment and authentication system to:
   receive a series of voice interactions; and
   create a voice profile by analyzing the series of the voice interactions, wherein the voice interactions include at least two similar requests or commands.

20. The system of claim 15, wherein the instructions, when executed by the one or more processors, further cause the enrollment and authentication system to:
   receive a subsequent request or command identifiable from the voice of the user;
   determine an activity authentication level to fulfill the subsequent request or command;
   analyze characteristics of the subsequent request or command, the characteristics including at least one of: pitch, intonation, speed, attenuation, accent, cadence, and volume;
   authenticate the user via the voice biometric authentication program to an authentication level based on the characteristics of the voice speaking the subsequent request or command; and
   fulfill the subsequent request or command when the authentication level meets or exceeds the activity authentication level.

\* \* \* \* \*